US005878925A

United States Patent [19]

Denkins et al.

[11] Patent Number: 5,878,925

[45] Date of Patent: Mar. 9, 1999

[54] DRYWALL JOINT COMPOUND PUMP WORKSTATION

[75] Inventors: Jeffrey L. Denkins; Steven J. Mondlock, both of Kaukauna, Wis.

[73] Assignee: Apla-Tech, Inc., Kaukauna, Wis.

[21] Appl. No.: 877,466

[22] Filed: Jun. 17, 1997

[51] Int. Cl.[6] .......................... A01C 35/00; A62C 15/00; A62C 11/00; B05B 9/04

[52] U.S. Cl. .......................... 222/608; 222/609; 239/154; 239/321; 239/329; 239/331

[58] Field of Search .................................... 239/154, 321, 239/329, 331; 222/608, 609

[56] References Cited

U.S. PATENT DOCUMENTS

| | | | |
|---|---|---|---|
| 2,596,074 | 5/1952 | Hawes | 239/331 |
| 2,815,142 | 12/1957 | Ames | 216/25 |
| 4,327,845 | 5/1982 | Keyes et al. | 239/331 |
| 4,440,410 | 4/1984 | Bradshaw | 280/47.26 |
| 4,504,293 | 3/1985 | Gillingham et al. | 55/350 |
| 4,580,749 | 4/1986 | Howard | 248/161 |
| 5,154,317 | 10/1992 | Roppolo, III | 222/608 |
| 5,279,700 | 1/1994 | Retti | 156/578 |
| 5,328,096 | 7/1994 | Stenge et al. | 239/123 |
| 5,349,992 | 9/1994 | Gallo et al. | 222/608 |
| 5,366,309 | 11/1994 | Springall | 222/608 |
| 5,390,825 | 2/1995 | Rockel | 222/608 |
| 5,544,791 | 8/1996 | Chih | 222/608 |
| 5,570,953 | 11/1996 | DeWall | 366/10 |

*Primary Examiner*—Gregory L. Huson
*Assistant Examiner*—Keats Quinalty
*Attorney, Agent, or Firm*—Andrus, Sceales, Starke & Sawall

[57] ABSTRACT

A portable drywall joint compound pump workstation supplies joint compound to a workstation outlet that is conveniently located. The workstation includes a joint compound supply reservoir having an open top, a pump that pumps joint compound from the supply reservoir, a portable cart that supports the supply reservoir and the pump, and a removable transport tube that feeds joint compound from the pump to the workstation outlet. With the transport tube in place the workstation outlet is held in a relatively stable position in the vicinity of the open top of the supply reservoir. The pump is located below the joint compound supply reservoir, and is a gravity-fed, pneumatic diaphragm pump. The pump inlet is connected to the bottom of the supply reservoir and the pump outlet is located beneath the pump inlet. The pump is thus self-draining. A compressed air manifold assembly including a plurality of compressed air supply ports is provided. A number of accessories are also provided to facilitate the handling of drywall joint compound, and on-site rinsing and cleaning of the workstation and various drywall finishing tools.

24 Claims, 7 Drawing Sheets

FIG. 3
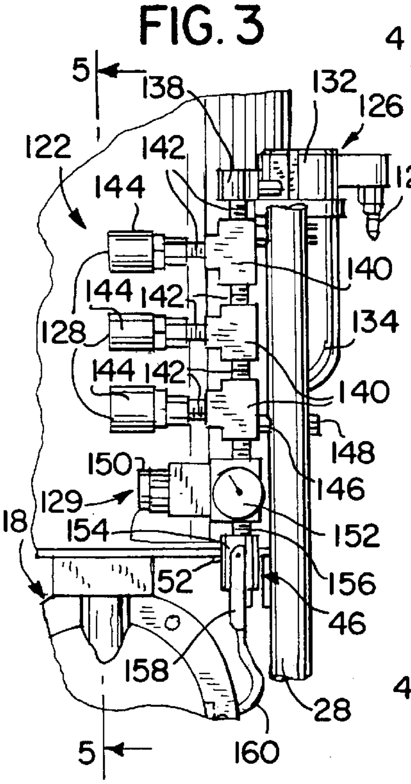
FIG. 4
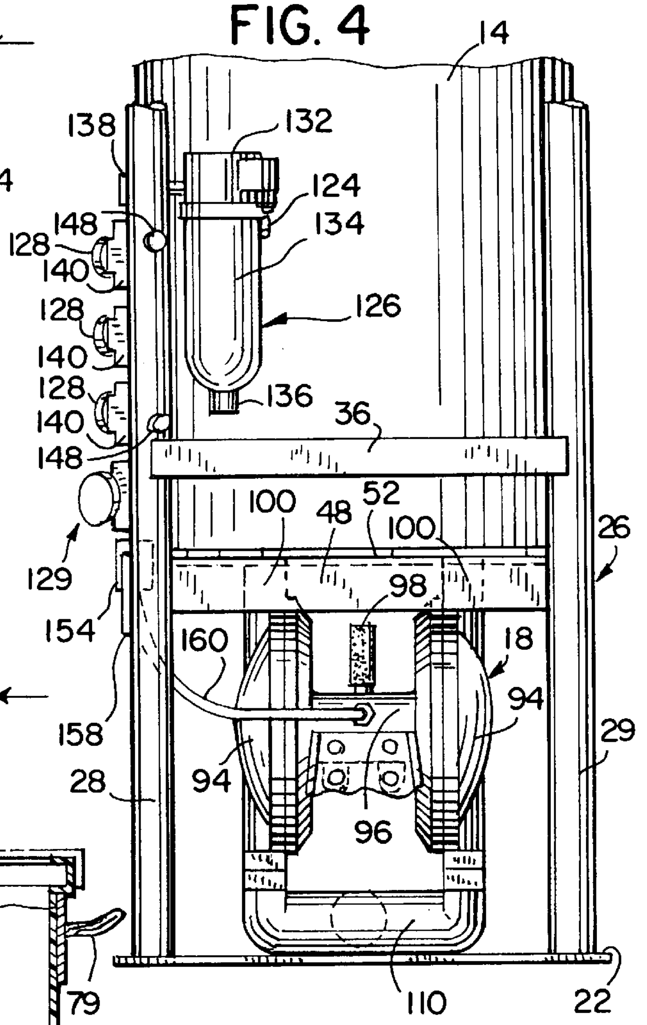
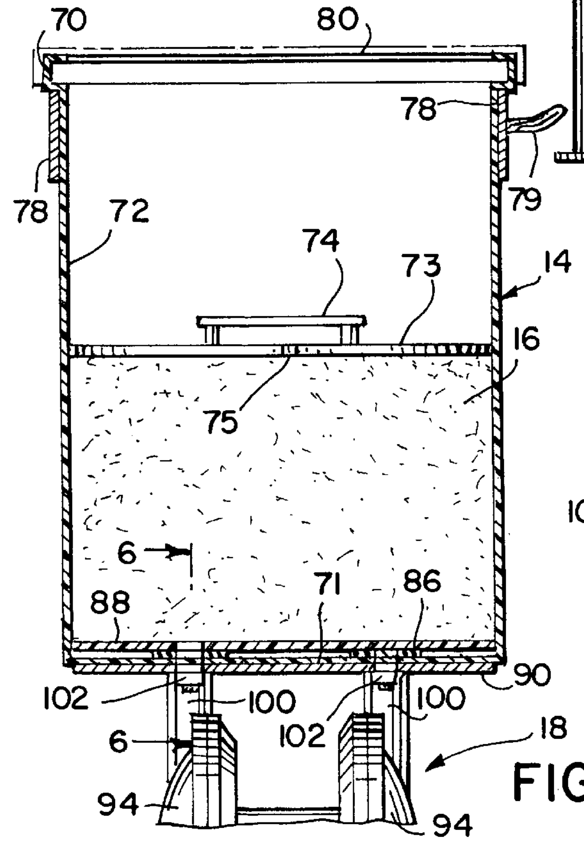
FIG. 5
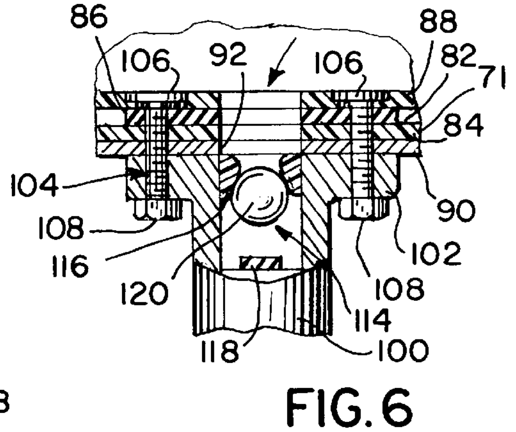
FIG. 6

202
204
205
206
208
209
210
214
215
216
218
219
220
142
140
156
144
128
129
222
28
112
111
110
18
22
212
179
182
226
224

DRYWALL JOINT COMPOUND PUMP WORKSTATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is a drywall joint compound pump workstation that, among other functions, facilitates mixing of drywall joint compound, pumps joint compound into drywall tools, and that facilitates clean up.

Drywall has become a dominant material in the production of interior building partitions. In particular, interior building partitions generally comprise a vertical stud wall which is used as a support for preformed drywall panels that are attached to the stud wall. Joints between adjacent panels of drywall are usually taped and finished with joint compound. One type of apparatus for applying joint compound is disclosed in U.S. Pat. No. 2,815,142 issued Dec. 3, 1957. This apparatus mechanically applies tape and joint compound contemporaneously. The apparatus includes a reservoir for joint compound which needs to be filled before applying the joint compound to the drywall surface. After the tape and the first coat of joint compound has been applied over the joint, it is typical to apply a second and sometimes even a third coat of joint compound. The second and third coats are typically applied using finishing tools such as a corner head, or a flat box. Conventional flat boxes need to be filled with joint compound.

A pneumatic apparatus for applying joint compound is disclosed in Denkins et al. U.S. patent application Ser. No. 08/659,284 filed Jun. 6, 1996. This apparatus also needs to be filled with joint compound before applying the joint compound to the joint between adjacent panels of drywall. The apparatus is powered by compressed air which can be easily metered to effectively control the application of joint compound. Several finishing attachments, such as corner heads and flat joint attachments can be attached to the apparatus.

Typically, other pneumatic systems or tools are employed at the same work site. For instance, pneumatic texture guns are often used to apply particulate matter similar to joint compound to the drywall surface to texture the surface with a distinctive surface appearance or to acoustically treat the drywall surface. Texture gun systems typically include a supply reservoir that holds a supply of liquified particulate matter similar to joint compound, and a pneumatic pump that delivers the liquified particulate matter to a texture gun. The texture gun also receives compressed air to apply the particulate matter to the drywall surface. Normally, the system is mounted in a portable cart. In some systems, the supply reservoir and the pump are not balanced on the cart which sometimes creates difficulties in moving the system.

When working with drywall finishing tools, a substantial amount of time can be spent mixing joint compound, filling application tools with joint compound, and cleaning the tools. There is a need in the art for a drywall joint compound pump workstation that can effectively accommodate these needs, as well as other needs present at drywall construction work sites.

BRIEF SUMMARY OF THE INVENTION

The invention is a drywall joint compound pump workstation that effectively mixes and pumps joint compound for drywall finishing tools. The pump workstation has a series of quickly interchangeable attachments and is extremely versatile. The workstation is also designed to facilitate rinsing and cleaning of the workstation and drywall finishing tools at the work site. In addition, the preferred workstation provides compressed air for operating pneumatic tools and a texture gun attachment.

In one aspect, the invention is a drywall joint compound pump workstation having a joint compound supply reservoir with an open top, and a pump (preferably pneumatic) that delivers joint compound from the supply reservoir to a workstation outlet. A transport tube having a first end connected to the pump and a second end joined to the workstation outlet feeds the joint compound from the pump to the workstation outlet. The second end of the transport tube is held in a relatively stable position in the vicinity of the open top of the supply reservoir. The position of the second end of the transport tube is convenient for dispensing joint compound, thus making the filling of drywall finishing tools easy for workmen.

The transport tube preferably includes a quick disconnect fitting at its second end, such as a cam lever coupling, positioned in the vicinity of the open top of the supply reservoir. Various attachments can be connected to the quick disconnect fitting. The preferred workstation includes a removable gooseneck attachment having a first end that can be removably connected to the second end of the transport tube, and a free end swingably positioned over and away from the supply reservoir. The gooseneck attachment can be used to recirculate joint compound from the supply reservoir through the pump back into the supply reservoir. This is extremely useful for mixing joint compound both initially, and intermittently during the work day.

A tubular filling adapter can replace the gooseneck attachment to facilitate the direct filling of drywall joint compound application tools, such as the tools shown in U.S. Pat. No. 2,815,142 and copending patent application Ser. No. 08/659,284. Another special adapter is also preferably provided to fill mechanical flat boxes.

A water cleaning attachment can be used to spray pressurized water and facilitate clean up. Preferably, the water cleaning attachment is connected to the free end of the gooseneck attachment. The water cleaning attachment includes a hose and spray nozzle.

In another aspect, the invention is a portable drywall joint compound pump workstation in which the pump is a gravity-fed, pneumatic diaphragm pump having a pump inlet located below the bottom of the supply reservoir and a pump outlet located below the pump inlet. The pump is thus self-draining. The pump inlet is provided with a ball valve having a ball that floats in water, thus providing improved sealing qualities for the ball valve and enhancing pump efficiency when pumping water.

It is preferred that the workstation be mounted on a conventional wheeled hand truck. The pump is preferably mounted to the base of the hand truck and the supply reservoir is mounted directly above the pump so that both the pump and the supply reservoir are balanced on the hand truck. The pump inlet extends upward through the bottom of the supply reservoir. The bottom of the supply reservoir is preferably reinforced, and the pump inlet through the bottom of the supply reservoir is sealed.

Another feature of the invention is a compressed air manifold assembly that includes a plurality of compressed air supply ports positioned on the workstation. Preferably, three compressed air supply ports are provided upstream of a pressure regulator that provides regulated compressed air to power the pneumatic pump. The compressed air supply ports can be used to operate the workstation as a texture gun, or to operate other pneumatic tools at the work site.

Other advantages and features of the invention will be apparent upon reviewing the drawings and the following description thereof.

BRIEF DESCRIPTION OF THE SEVERAL VIEWS OF THE DRAWING

The drawings illustrate the best mode presently contemplated of carrying out the invention. In the drawings:

FIG. 3 is an enlarged, fragmentary detailed view of a compressed air manifold assembly included in the workstation shown in FIG. 1;

FIG. 4 is an elevational view taken on line 4—4 of FIG. 3 and depicting a partial rear view of the workstation shown in FIG. 1;

FIG. 5 is cross sectional view taken on line 5—5 of FIG. 4 illustrating the construction of a supply reservoir included in the workstation shown in FIG. 1;

FIG. 6 is a cross sectional view taken on line 6—6 of FIG. 5 showing a ball valve in the pump;

DETAILED DESCRIPTION OF THE INVENTION

Figure 1:
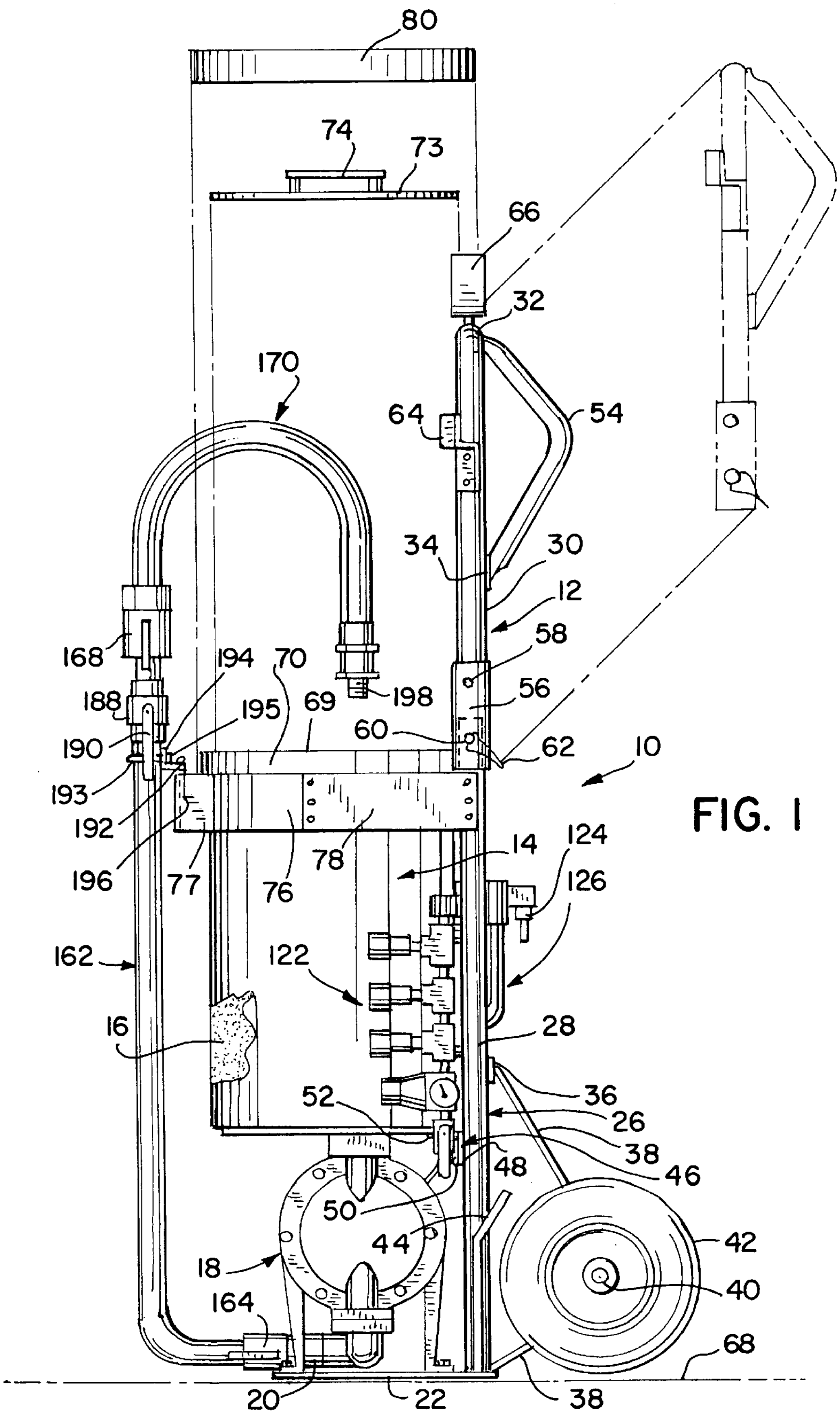
FIG. 1 is a side elevational view of a drywall joint compound pump workstation in accordance with the present invention.

FIG. 1 is a side view of a drywall joint compound pump workstation 10 in accordance with the invention. The workstation 10 comprises a framework 12 that supports a supply reservoir 14 for holding a supply of joint compound 16 (or other particulate matter) and a pump 18 for delivering the joint compound 16 from the reservoir 14 to a workstation outlet 20. The physical location of the workstation outlet 20 can change based on the connection of various attachments to the workstation 10.

The framework 12 is preferably a conventional mobile hand truck constructed of heavy gauge steel. The mobile hand truck 12 has a flat, horizontally extending base plate 22 and a tubular U-shaped skeletal structure 24 which rises upwardly from the rear of the base plate 22. The skeletal structure 24 includes a lower portion 26 having a pair of spaced apart, parallel legs 28, 29 (FIG. 4), and an upper portion 30 in which the legs 28, 29 gradually merge together at 32. Upper and lower horizontal braces 34, 36, respectively, interconnect the legs 28, 29 and reinforce the hand truck 12. A wheel support bracket 38 extends rearwardly from the lower horizontal brace 36 and the base plate 22 to support an axle 40 on each end of which a rubber-tired wheel 42 is rotatably mounted. An upwardly and rearwardly extending fender 44 is welded along the lower end of each leg 28, 29. A forward facing angle bracket 46 is disposed transversely across the legs 28, 29 of the lower portion 26 slightly below and on the other side of lower horizontal brace 36. Angle bracket 46 includes a vertical wall 48 that is solidly anchored to each leg 28 by fasteners 50, and a horizontal wall 52 that defines a ledge for supporting the reservoir 14. The upper portion 30 is conveniently provided with a rearwardly extending, generally V-shaped, reinforcing handle 54 which is joined to the top 32 of the upper portion 30 and the upper horizontal brace 34.

Each lower end of upper portion 30 is slidably received in one end of a cylindrical sleeve 56 and is held in place by a fastener 58, such as a bolt, which passes through suitably aligned apertures formed in the legs 28 and sleeve 56. A nut (not shown) is used to prevent the bolt 58 from dislodging. Additionally, each upper end of the lower portion 26 is telescoped into the other end of sleeve 56 and maintained in position by a retaining pin 60 which passes through suitably aligned holes formed in the sleeve 56 and legs 28, 29. A spring-biased clip 62 can be used to hold each retaining pin 60 in place. As shown in phantom in FIG. 1, the clip 62 can be manipulated such that the upper portion 30 of the framework 12 can be selectively removed from and rejoined to the lower portion 26. The upper portion 30 also carries an angular cradle bracket 64 along one leg 28 thereof and a U-shaped cradle bracket 66 at the top 32 thereof, both brackets being employed to support auxiliary apparatus as will be described hereafter.

The hand truck 12 is designed so that the base plate 22 normally rests on a floor or ground surface 68 with each wheel 42 being slightly elevated above the ground surface 68. Grasping the upper portion 30 and handle 54 and tilting the hand truck 12 rearwardly brings each wheel 42 into contact with the ground surface 68 so that the workstation 10 may be easily moved. It should be appreciated that the workstation 10 is rugged and portable.

FIGS. 1 and 5 illustrate the supply reservoir 14 that holds the joint compound 16. Joint compound is conventionally formed on-site by adding water to a dry mix to obtain a relatively thick, liquified, flowable mixture or slurry. The supply reservoir 14 is preferably a large capacity (i.e. 10 gallon) cylindrical container made of non-corrosive material such as high density polyethylene. The reservoir 14 includes an open top 69 having a circumferential, outwardly extending lip 70, a closed layered bottom 71 in communication with pump 18 and a generally smooth inside surface 72 within which a floating lid 73 is slidably disposed. The lid 73 is provided with a handle 74 and a small relief through hole 75 that is located in the center of the lid 73 directly below the handle 74. The lid 73 is designed to be placed firmly against the uppermost surface of the joint compound 16 in the reservoir 14 being suctioned by the pump 18 therebeneath. The lid 73 pushes downwardly in a self-leveling manner on the joint compound in the reservoir 14. Any excess air is exhausted via the through hole 75 to prevent air pockets from forming in the mixture. The through hole 75 also facilitates extraction of the lid 73 by admitting air to the bottom side thereof as the lid 73 is pulled upwardly out of the reservoir 14, such as when the joint compound 16 is substantially emptied therefrom. A cover 80 also preferably formed of a non-corrosive material such as polyethylene fits snugly over the lip 70 and closes the open top 69 when desired.

Surrounding the reservoir 14 beneath the lip 70 is a wide metal band 76 that carries a forward facing saddle bracket 77. On each side of the reservoir 14, a rectangular metal bolstering plate 78 is connected between the band 76 and a respective leg 28, 29 of hand truck 12 along the area immediately below the sleeve 56. A laterally extending accessory hanger 79 is attached to one of the bolstering plates 78 as shown in FIG. 5 and can be used to support auxiliary equipment.

As seen in FIGS. 5 and 6, the bottom 71 of the reservoir 14 has an upper surface 82 and a lower surface 84 and is supported structurally by a reinforced, layered construction. In particular, the upper surface 82 supports a round, liquid-tight seal 86 having a diameter that is substantially less than the reservoir bottom 71. The seal 86 prevents leakage from the bottom 71 of the reservoir 14 outside of the pump 18. The seal 86 in turn supports a circular insert or liner 88 having a diameter slightly smaller than the reservoir bottom 71 so that it fits tightly against the inside surface 72 of the reservoir 14. The liner 88 is preferably constructed of high density polyethylene or another suitable non-corrosive material. The lower surface 84 of the reservoir bottom 71 rests directly upon a rigid metal circular plate 90 having a diameter slightly less than the reservoir bottom 71. The rigid metal circular plate 90 forms a mounting surface for the pump 18. A pair of spaced bores 92, one of which is depicted in FIG. 6, is formed through the layered construction comprised of the liner 88, the seal 86, the reservoir bottom 71 and the plate 90. Each of the bores 92 establishes communication between the reservoir 14 and the pump 18.

Referring now to FIGS. 1, 4 and 6, the pump 18 is preferably a modified version of a pneumatically-driven, suction-type diaphragm pump model no. 66610X-X-C manufactured by the Aro Corporation of Bryan, Ohio. The pump 18 includes a pair of diaphragm housings 94, an air motor 96 between the housings 94, and a muffler 98 to quiet the sound of the motor 96. Before modifying the pump 18, the pump 18 is constructed so that the pump inlets are located below the diaphragm housing 94 and the pump outlets are located above the diaphragm housings 94. In accordance with the invention, the pump 18 is inverted so that the two pump inlets 100 are aligned with the bores 92 through the bottom 71 of the supply reservoir 14, and a pair of inlet flanges 102 is placed against the underside of metal plate 90. A pair of bolts 104 passes through aligned openings formed in the inlet flanges 102, the plate 90, the reservoir bottom 71 and the seal 86. The bolts 104 are secured by nuts 106 embedded in the liner 88 beneath the upper surface thereof. The bolts 104 are oriented with their heads 108 against the undersides of inlet flanges 102 and are dimensioned so that upon tightening the bolt shafts will not project beyond the upper surface of the liner 88. With this arrangement, the pump 18 is supportively mounted to and beneath the reinforced bottom 71 of reservoir 14.

Contemporaneously, the layers of the reinforced bottom 71 are tightly compressed together in a leak-proof relationship.

Inverting the pump 18 also places the pump outlet manifold 110 in a position just above the base plate 22 on the hand truck 12 beneath the pump inlets 100. Using fasteners 111, a pair of arch-like leg brackets 112 (FIG. 7) anchor the pump 18 centrally to the base plate 22 in a manner such that the pump 18 assists significantly in supporting the reservoir 14. This mounting configuration cooperates with the hand truck 12 to provide a mobile workstation 10 that is compact and balanced.

Referring in particular to FIG. 6, each pump inlet 100 is provided with a ball valve 114 permitting one-way flow of the joint compound 16 from the pump inlet 100 towards the outlet manifold 110. Valve 114 includes a circular collar 116 secured in the upper portion of pump inlet 100 and defining a valve seat, and a ball support 118 mounted beneath the valve seat 116 in the pump inlet 100. The valve 114 further includes a ball 120, preferably made of lightweight plastic, that moves in the pump inlet 100 between the circular collar 116 (i.e. closed position) and the support seat 118 (i.e. open position). It is preferred that the ball 120 be able to float in water in order to improve pump efficiency when the pump 18 is inverted. Before modifying and inverting the pump 18, the pump 18 uses a ball in the ball valves which sinks in water and thus facilitating the seating of the ball against the valve seat 116 (i.e. gravity facilitates closing of the valve). However, when the pump 18 is inverted, the valve seat 116 is located above the ball 120. Therefore, in the modified pump the ball 120 floats in water to facilitate seating of the ball 120 against the valve seat 116 when the pump 118 is inverted. Preferably, the ball valves for the pump outlet also have floating balls.

The inversion of the pump 18 provides a pump which is gravity-fed and self-draining so that any fluid or mixture in reservoir 14 can displace the ball 120 in pump inlet 100 and inherently flow downwardly to the outlet manifold 110. The gravity feed, along with the use of floating balls 120 improves the efficiency of the pump 118 so that the pump requires less energy. The self-draining feature is particularly important in cold climates so that water does not remain in the pump 18, and cannot freeze within the pump to cause damage to the pump 18.

Figure 2:
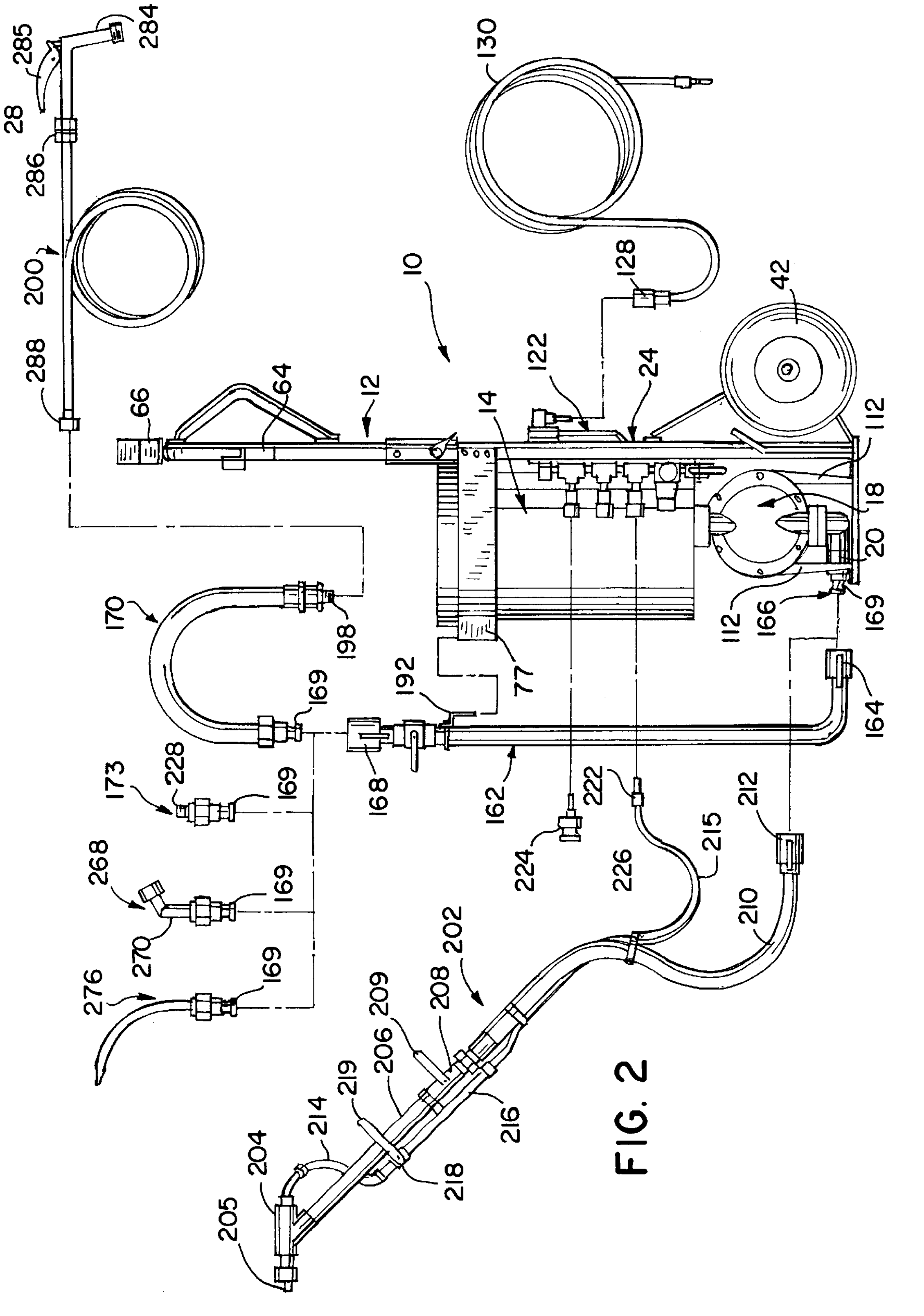
FIG. 2 is an exploded view of the workstation in accordance with the invention including an assortment of peripheral attachments employed therewith.

FIGS. 2, 3 and 4 illustrate a compressed air manifold assembly 122 on the hand truck 12 that regulates and distributes compressed air both for operating and cleaning the workstation 10, and for operating and cleaning tools and accessories. The compressed air manifold assembly 122 comprises an air inlet 124, an air filter 126, a bank of compressed air supply ports 128 and a pressure regulator 129. The air inlet 124 is connected to a supply of compressed air (e.g. an on-site air compressor, not shown) by a quick disconnect fitting 128 through an air hose 130 (FIG. 2). Air entering the quick disconnect fitting 128 flows through the air inlet 124 until the air reaches the air filter 126. The air filter 126 collects condensation or particles which sometimes condense or accumulate in the air hose 130 and the air compressor when the workstation 10 has been idle. The air filter 126 includes a filtering element 132 combined with a transparent sight glass 134 through which the amount of filtering can be monitored. The sight glass 134 includes a plug 136 on its bottom end through which excess moisture can be drained.

Air passing through the air filter 126 travels through a head fitting 138 and flows downwardly into the bank of compressed air supply ports 128. These ports 128 are defined by a stacked vertical array of three air channeling, T-blocks 140 serially connected together. Each of the T-blocks 140 is provided with internal passageways (not shown) adapted to receive externally threaded connectors 142 which are brazed to the T-blocks 140 to ensure air tight connections. Each of the T-blocks 140 is also provided with a quick disconnect fitting 144 that selectively delivers air therethrough when coupled to a pneumatic tool. The compressed air supply ports 128 are designed so that air will flow downwardly and, as desired, laterally through each of the T-blocks 140. Extending from the rear side of upper and lower T-blocks 140 is a sealed threaded shaft 146 which passes through a suitable hole formed in the leg 28 of hand truck 12 and is locked thereto by a nut 148. The connection enabled by the shafts 146 and the nuts 148 serves to solidly secure the entire compressed air manifold supply assembly 122 to the leg 28 of hand truck 12. A particularly attractive feature afforded by the invention resides in the accessibility and the connectability of the compressed air supply ports 128 resulting from the arrangement described above.

Compressed air blowing from the lower T-block 140 enters the top of the pressure regulator 129. Pressure regulator 129 has an adjustment knob 150 and a read-out dial 152 which provides a visual indication of the air pressure passing through the pressure regulator 129. The adjustment knob 150 can be rotated to increase or decrease the air pressure. The pressure regulator 129 is connected to a manually activated air shut-off valve 154 by an externally threaded connector 156. The shut-off valve 154 has an internal passageway (not shown) which selectively admits and prevents air flow therethrough by means of an air actuator handle 158 which is rotatable through 90° of movement. When the handle 158 is in the vertical position shown in the drawings, air will freely flow into an air tube 160 joining the shut-off valve 154 with the air motor 96 that drives the pump 18. To shut off the flow of compressed air to the pump 18, the handle 158 is rotated to a horizontal position to close the internal passageway in the shut-off valve 154.

Turning now to FIGS. 1 and 2, the workstation 10 includes a generally L-shaped transport tube 162 that in effect moves the workstation outlet 20 upwardly to a convenient location above the open top 69 of the reservoir 14 so that the joint compound 16 is readily available to the drywaller. The transport tube 162 is preferably a rigid metal tube having a first or lower end provided with a quick disconnect cam lever coupling 164 removably attached to the pump outlet 20. Preferably, the pump outlet 20 has an adapter 166 (FIG. 2) having a common adapter structure 169 that fits the quick disconnect cam lever coupling 164. The transport tube 162 also has a second or upper end provided with a quick disconnect cam lever coupling 168, which is also adapted to cooperate with the common adapter structure 169 for interchangeably mounting an inverted U-shaped, tubular gooseneck attachment 170 (FIG. 1), a tubular fitting attachment 173 (FIGS. 10, 11), or 268 (FIG. 12), and a flat box filling attachment 276 (FIG. 13).

Figure 10:
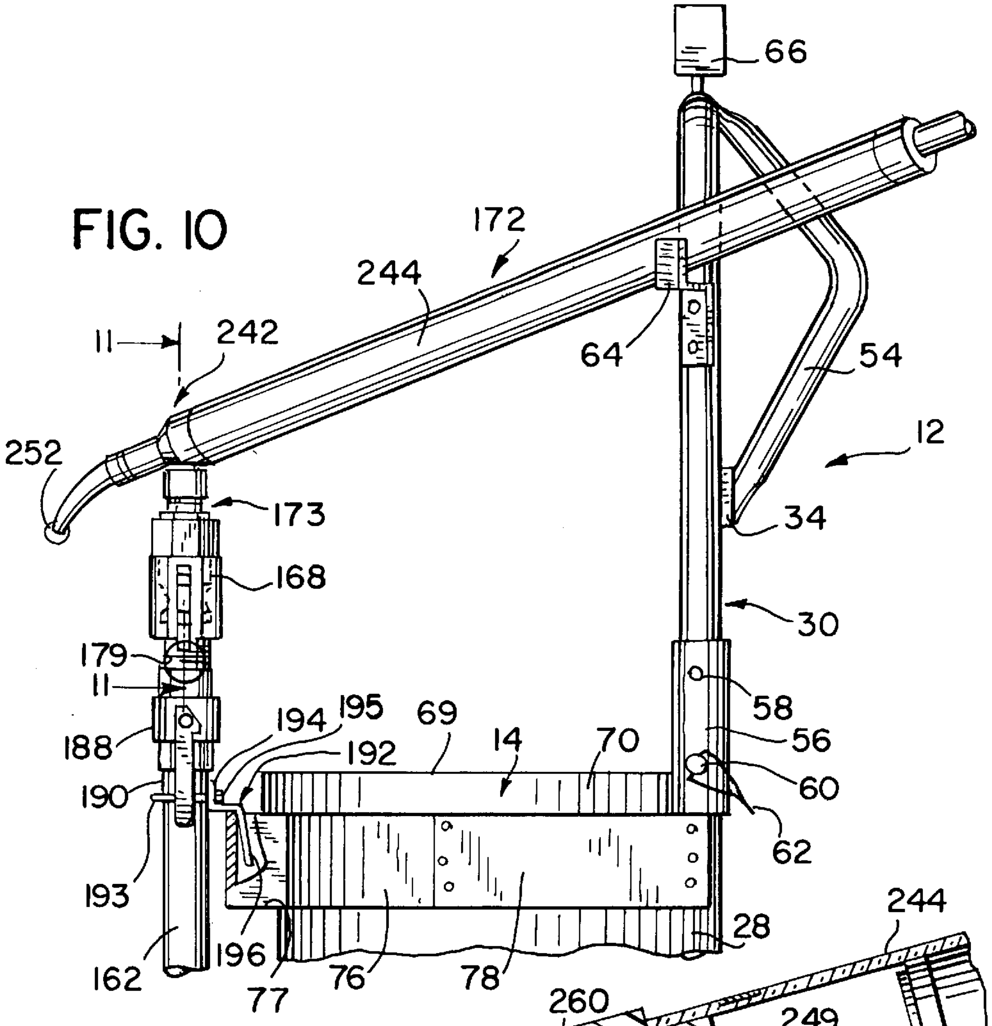
FIG. 10 is a partial side elevational view of a pneumatic apparatus for applying joint compound being filled with joint compound using the workstation shown in FIG. 1.
Figure 11:
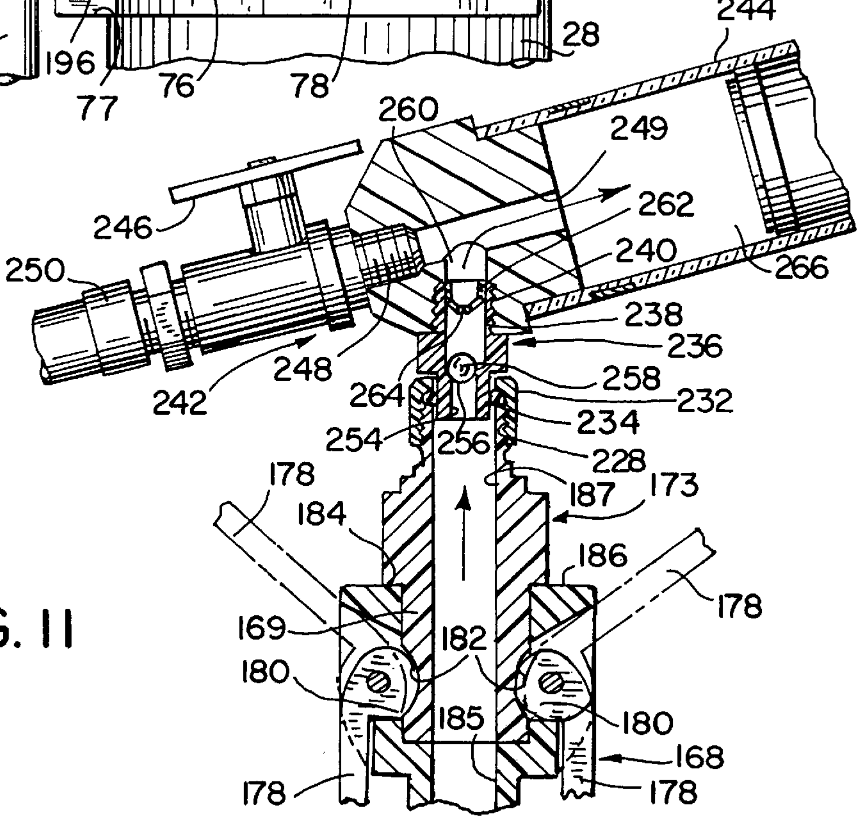
FIG. 11 is enlarged cross sectional view taken on line 11—11 of FIG. 10.

Referring to FIG. 11, the cam lever coupling 168 (which is similar in structure to coupling 164) is commercially manufactured by Terra Products, Inc. of Crawfordsville, Ind. and sold under the Banjo® trademark. Each coupling 168 includes a pair of pivotally mounted arms 178 having eccentrically-shaped cam surfaces 180 which are selectively moved into and out of frictional engagement with an annular channel 182 formed on the bottom end of the adapter structure 169. Each of the arms 178 may be provided with a finger ring 179 (FIGS. 8, 10, 12 and 13) to make the coupling and uncoupling easier. When the arms 178 are pivoted upwardly, as shown in phantom lines, the adapter structure 169 may be freely telescoped into and out of the coupling 168. However, once the adapter structure 169 has been telescoped so that its shoulders 184 engage the outer end 186 of coupling 168, the arms 178 may be pivoted downwardly along side the coupling 168 to quickly connect the adapter structure 169 therein. Both the coupling 168 and the adapter structure 169 are formed with aligned internal passageways 185, 187, respectively, which are positioned in communication with the transport tube 162.

Referring again to FIGS. 1 and 2, the upper end of transport tube 162 includes a trim valve 188 mounted directly beneath the quick disconnect coupling 168 for controlling the amount of pumped joint compound 16 dispensed through transport tube 162. An actuator handle 190 is mounted on the trim valve 188 so that when the handle 190 is in the vertical position shown in FIG. 1 joint compound 16 will flow freely through the quick disconnect coupling 168. When the handle 190 is in the horizontal position shown in FIG. 2, joint compound 16 will be prevented from flowing through the coupling 168. Moving the handle 190 between the vertical and horizontal positions will result in metering various amounts of joint compound 16 through the coupling 168 depending on the position of the handle 190 between 0° and 90°.

The transport tube 162 includes a stabilizing bracket 192 that keeps the upper end of the transport tube 162 in a relatively stable position in the vicinity of the open top 69 of the reservoir 14. The stabilizing bracket 192 has an upwardly extending back portion 194 fastened by U-bolt 193 and nuts 195 to the transport tube 162 immediately beneath the trim valve 188. Bracket 192 also has a downwardly depending leg portion 196 that is removably hooked into and out of the saddle bracket 77. In the position shown in FIG. 1, the disposition of the transport tube 162 causes the leg portion 196 of the bracket 192 to maintain engagement against the forward wall of saddle bracket 77 thereby holding the upper end of the transport tube 162 in relatively stable position in the vicinity of the open top 69 of reservoir 14. This feature is particularly useful in making joint compound 16 conveniently available above the open top 69 of the reservoir 14 without requiring the drywaller to bend over.

The tubular gooseneck attachment 170 has one end formed with the adapter structure 169 of the type described above which is removably connected to the quick disconnect coupling 168. Because of the annular channel 182, FIG. 11, the adapter structure 169, while being prevented from separating from the coupling 168, is also rotatably mounted thereto so that the gooseneck attachment 170 is manually swingable with respect to the reservoir 14. Normally, the other end 198 of the gooseneck attachment 170 remains free and is swingable over and away from the open top 69 of reservoir 14. In this way, the free end 198 may be used away from the open top 69 to dispense joint compound 16 into a pan or bucket, or may be disposed over the open top 69 to recirculate joint compound 16 and mix the joint compound 16. The free end 198 of the gooseneck attachment 170 can be provided with a removable, externally threaded coupling 198 adapted to receive a water cleaning attachment 200 used for clean-up of the workstation 10 and tools.

The operation of the workstation 10 with the transport tube 162 and the gooseneck attachment 170 positioned as shown in FIG. 1 will now be described. In preparation for use, the cover 80 and the lid 73 are both removed. The air inlet 124 is connected via air hose 130 to a compressor, preferably a portable compressor or any other source of compressed air. Dry joint compound 16 and water are added to the reservoir 14. With the gooseneck attachment 170 disposed over the open top 69 of the reservoir 14 and trim valve 188 opened, the mixing process is initiated by continuously delivering the mixture through the pump 18 and continuously recirculating the mixture through the gooseneck attachment 170 back into the reservoir 14. This should continue until a homogenous mixture is achieved without lumps, and the joint compound is mixed to its desired consistency.

After mixing, the gooseneck attachment 170 may be swung away from the open top 69 of the reservoir 14 to deliver joint compound 16 into a pan, other container or tool. When dispensing joint compound the floating lid 73 should be placed firmly against the top surface of the joint compound 16 being extracted through the bottom of the reservoir 14. As discussed above, the floating lid 73 keeps the joint compound level within the reservoir and prevents air pockets from forming therein. Once the joint compound 16 is exhausted, the relief through hole 75 allows the lid 73 to be easily removed to either mix another load of joint compound 16 or clean the workstation 10. The workstation 10 can be cleaned by filling the reservoir 14 with water, and continuously recirculating the water through the pump 18 through the gooseneck attachment 170 back into the reservoir 14. After using the water to rinse the workstation 10, the water can be dispensed, or can be used to clean other tools and/or accessories.

In the basic operation of the workstation 10, it should be appreciated that the compressed air manifold assembly 122 provides at least three compressed air supply ports 128 which may be used to pneumatically power various hand guns or other power applicator tools. Once a drywall job has been completed, the user can employ the compressed air supply ports 128 to pneumatically discharge and clean any unused joint compound 16 from the applicator tools attached to the air supply manifold assembly 122.

Although the invention has been described as being particularly useful in mixing and pumping joint compound 16, FIGS. 7–14 show additional attachments that expand the functions that can be performed by the workstation 10.

Figures 7, 8, 9:
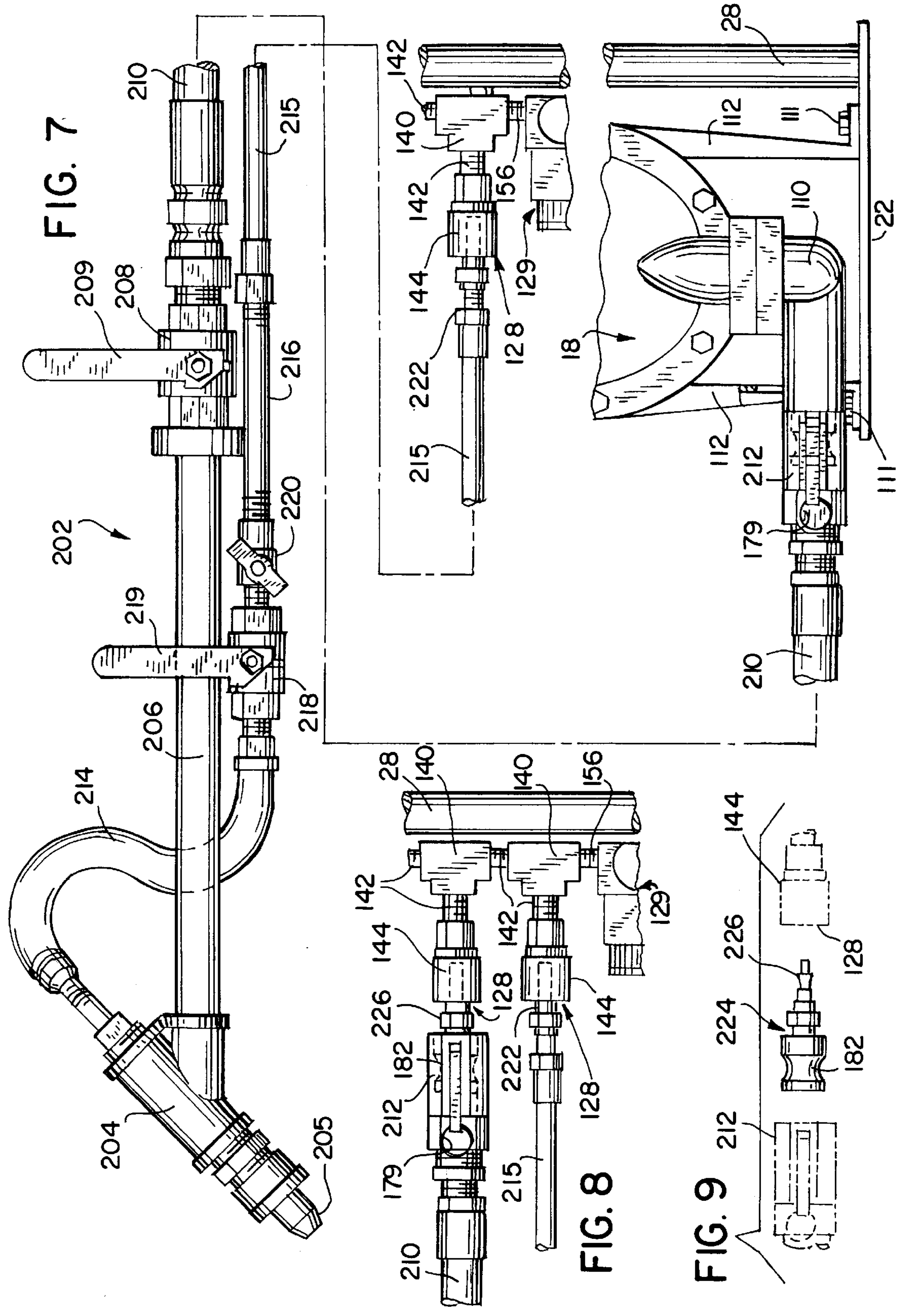
FIG. 7 is a fragmentary, exploded side view of a texture gun selectively attached to the workstation shown in FIG. 1.
FIG. 8 is a view similar to FIG. 3 depicting the attachment of the texture gun to the compressed air manifold assembly for cleaning purposes.
FIG. 9 is a side view of an adapter selectively used to connect one end of the texture gun shown in phantom with a portion of the compressed air manifold assembly shown in phantom.

FIGS. 2 and 7 illustrate a texture gun attachment 202 that can be attached to the workstation 10 in lieu of the transport tube 162 when it is desired to create a textured surface over an otherwise smooth piece of drywall. Texture gun attachment 202 consists of a spray nozzle 204, a straight, rigid delivery conduit 206, a manually operable trim valve 208 for controlling the flow of joint compound 16 to the spray nozzle 204, and a supply hose 210. The end of the supply hose 210 is provided with a quick disconnect cam lever coupling 212 similar to the couplings 164, 168 which are removably connected to the adapter structure 169 on the pump 18 and transfer tube 162. The texture gun attachment 202 further consists of a first air hose 214, a second air hose 215 having a smaller diameter than air hose 214, a rigid delivery tube 216, a manually operable trim valve 218 with a handle 219, and a manually operable shut-off valve 220 for controlling compressed air flow through the air hoses 214, 215. Hose 215 includes an air connector 222 that is quickly coupled to one of the supply ports 128 on air manifold supply assembly 122. The trim valve 218 and shut-off valve 220 are opened and adjusted such that the supply of compressed air flows to spray nozzle 204. To supply joint compound 16 to the spray nozzle 204, the trim valve 208 is pivoted as previously discussed. Compressed air sprays joint compound 16 forward from the nozzle 204 and tip 205 creating the textured effect desired.

As depicted in FIGS. 8 and 9, the joint compound supply hose 210 on the texture gun attachment 202 can be attached to the workstation 10 compressed air supply to clean joint compound from the hose 210. A texture gun adapter 224 is used to couple the quick disconnect coupling 212 on the joint compound supply hose 210 to one of the compressed air supply ports 128. The texture gun adapter 224 has a forward end provided with an annular channel 182 as previously described, and a rearward end 226 that can be quickly coupled to a compressed air supply port 128 on the compressed air manifold assembly 122. The adapter 224 has an internal passageway which allows compressed air to be delivered through the supply hose 210, the opened trim valve 208, the delivery conduit 206 and the spray nozzle 204 of the textured gun attachment 202. Since the hoses on a texture gun can be quite long (e.g., 50 feet), it is extremely important to maximize the evacuation of any excess material so that future joint compound application will not be impaired. The texture gun 202 can then be rinsed out by removing the adaptor 224 and coupling the texture gun supply hose 210 to the upper end 188 of the transfer tube 162 when the workstation 10 reservoir 14 is filled with water.

FIGS. 10 and 11 show in detail a pneumatic apparatus 172 for applying joint compound 16 to sheets of drywall such as manufactured by the assignee of this application. This apparatus 172 is more fully described in pending U.S. patent application Ser. No. 08/659,284, filed Jun. 6, 1996 which is herein incorporated by reference. A tubular filler adapter 173 for pneumatic apparatus 172 is removably supported at the quick disconnect coupling 168 at the upper end of the transport tube 162. The bottom portion of the adapter 173 has common adapter structure 169 as previously described while the top portion has an externally threaded pipe 228 surrounding an internal passageway 187 extending through the adapter 173. An internally threaded collar 232 having an O-ring 234 is connected to the pipe 228, and serves to sealingly receive and support the bottom of a one-way fill valve 236 on the pneumatic apparatus 172. Fill valve 236 has an internally threaded surface 238 that engages an internally threaded bore 240 in a mud supply head 242 on the pneumatic apparatus 172. Mud supply head 242 is mounted on the top end of a tubular storage body 244 that is used for storing joint 16 compound within the pneumatic apparatus 172. Mud supply head 242 includes a manually rotatable shut-off valve 246 having a threaded stem 248 which is screwed into a mud passageway 249. The shut-off valve 246 has an internal passageway (not shown) that allows mud or liquid to pass through the valve 246 and out a connector 250 leading to an applicator tip 252. Fill valve 236 has an internal passageway 254 provided with a ball seat 256 for receiving a ball 258. Fill passageway 254 is in axial alignment with a filling passageway 260 in mud supply head 242 which intersects the mud passageway 249.

Joint compound 16 is pumped out of the reservoir 14 through the transport tube 162 and enters fill valve 236. As the joint compound 16 enters the fill valve 236, it pushes the ball 258 away from the ball seat 256 so that the ball 258 contacts a stop member 262. The stop member 262 contains a series of openings 264 which allow joint compound 16 to flow around the ball 258 and into filling passageway 260. If shut-off valve 246 is closed, joint compound 16 flows into an expandable internal chamber 266 in the storage body 244. Once the chamber 266 has been filled, the fill valve 236 may be lifted off the collar 232, the storage body 244 may be lifted from bracket 64, and the apparatus 172 may then be used to apply joint compound to drywall.

The present invention accommodates the elongated body of the pneumatic apparatus 172 by supporting the other end of the apparatus in the angular cradle bracket 64 fixed on the leg 28 of hand truck 12. The bracket 64 is positioned to orient the pneumatic apparatus 172 at an inclined angle, which accommodates that geometry between the fill valve 236 on the pneumatic apparatus 172 and the tubular filling adaptor 173. The bracket 64 facilitates handling of the elongated tubular storage body 244 on the apparatus.

Figure 12:
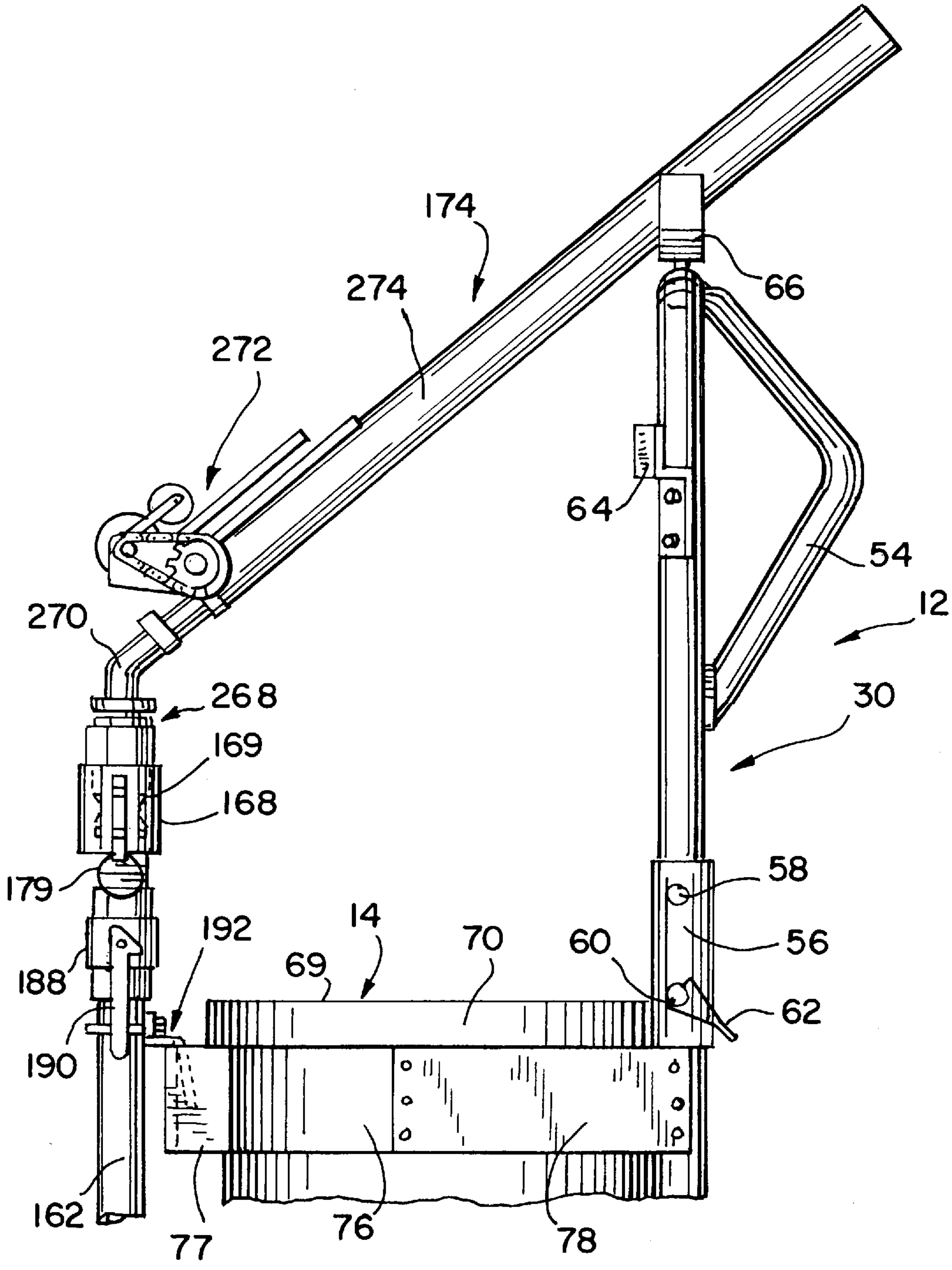
FIG. 12 is a partial side elevational view of a second apparatus for applying joint compound being filled with joint compound using the workstation shown in FIG. 1.
Figure 13:
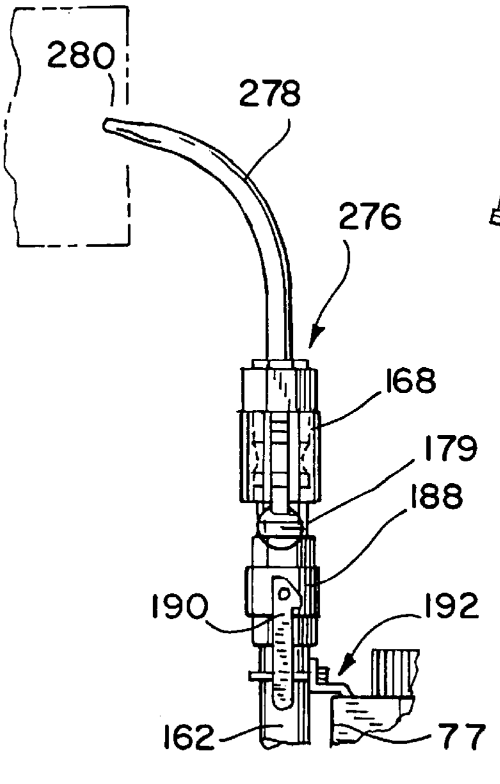
FIG. 13 is a partial side elevational view of a flat box dispenser tube selectively attached to the workstation shown in FIG. 1.

FIG. 12 shows a mechanical apparatus 174 for applying joint compound such as the type of apparatus manufactured by the Ames Company of Duluth, Ga. A tubular filler adaptor 268 for this mechanical apparatus 174 is removably positioned at the top of transport tube 162. The adapter 268 has an inclined neck 270 to accommodate the geometry of the filler neck on the mechanical apparatus 174. Again, provision is made for supporting the long, cylindrical storage body 274 by using the separate U-shaped cradle bracket 66 mounted at the top 32 of the hand truck 12.

FIGS. 2 and 13 illustrate the dispenser tube 276 used for filling a conventional flat joint box (shown in phantom). The lower portion of the dispenser tube 276 has the adapter structure 169 previously described while the upper portion is a curved, metal tube 278 having a fluted delivery end 280.

Figure 14:
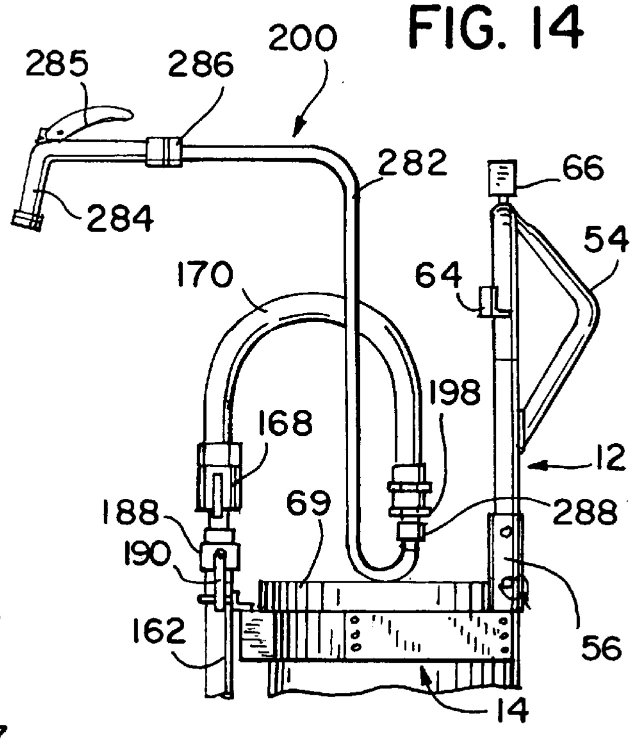
FIG. 14 is a partial side elevational view of a spray hose selectively connected to the workstation shown in FIG. 1.

Referring to FIG. 14, a water cleaning attachment 200 is shown connected to the gooseneck attachment 170. The water cleaning attachment 200 has a water hose 282, and a spray nozzle 284 having a trigger switch 285. The water hose 282 connects the spray nozzle 284 to a threaded connector 286 on the hose 282. The water hose 282 has another threaded connector 288 which attaches to the externally threaded connector 198 on the free end of the gooseneck attachment 170. To use the water cleaning attachment 200, the user first empties the joint compound 16 from the reservoir 14 and then adds water to the reservoir 14. The water provides a rinsing solution that can be recirculated throughout the reservoir 14, the pump 18, the transport tube 162 and the gooseneck attachment 170 (when the gooseneck attachment 170 is positioned over the open top 69 of the reservoir 14). When the joint compound 16 has been satisfactorily purged from the above mentioned components, the hose 282 is connected to the free end 198 of the gooseneck attachment 170, and with the trim valve 188 on the transport tube 162 closed, a supply of water is added to the reservoir 14. When it is desired to activate the water cleaning attachment 200, the pump 18 is activated and the trim valve 188 is opened to deliver pressurized water into the spray nozzle 284. The user can then depress the trigger switch 285 to spray water from the spray nozzle 284. In this manner the workstation 10 provides a pressurized source of water which is particularly useful and effective in cleaning tools and the workstation 10 itself. As desired according to the user, tools for applying and finishing joint compound 16 may be rinsed and cleaned either inside or outside the reservoir 14.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth in the following claims.

We claim:

1. A drywall joint compound pump workstation for mixing joint compound and supplying joint compound to an outlet, the workstation comprising:

a supply reservoir having an open top and a closed bottom for mixing and holding a supply of joint compound therein;

a pump attached to the supply reservoir for delivering the joint compound to the outlet;

a transport tube having a first end connected to the pump and a second end joined to the outlet for feeding joint compound from the pump to the outlet; and a shut-off valve for selectively preventing the flow of joint compound through the outlet;

wherein the outlet is able to be positioned such that joint compound flowing through the outlet flows through the open top of the supply reservoir thereby recirculating joint compound from the supply reservoir through the pump and the transport tube into the supply reservoir to promote thorough mixing of the joint compound.

2. The workstation of claim 1 wherein the second end of the transport tube is provided with a stabilizing bracket that is attachable to and detachable from the open top of the supply reservoir.

3. The workstation of claim 1 wherein at least one of the first and second ends of the transport tube is further provided with a quick disconnect fitting.

4. The workstation of claim 3 wherein the quick disconnect fitting is a cam lever coupling.

5. The workstation of claim 1 wherein both the first and second ends of the transport tube are provided with quick disconnect fittings.

6. The workstation of claim 1 further comprising a movable gooseneck attachment having a first end removably connected to the second end of the transport tube and a second end swingably positioned over and away from the supply reservoir.

7. The workstation of claim 6 further comprising a water cleaning attachment having a first end removably attached to the second end of the gooseneck attachment and a free end provided with a spray nozzle secured thereto.

8. The workstation of claim 1 further comprising a tubular filling adapter having a lower end removably mounted to the second end of the transport tube and an upper end cooperable with a filler neck for an apparatus that applies joint compound.

9. The workstation of claim 8 wherein the tubular filling adaptor has a 45° bend.

10. The workstation of claim 1 further comprising a flat joint box dispenser tube having a first end removably attached to the second end of the transport tube, and a second end to a horizontally oblong opening to facilitate filling a flat joint box with joint compound.

11. A drywall joint compound pump workstation for supplying joint compound to a workstation outlet, the workstation comprising:

a supply reservoir provided with a top, a bottom and an inside surface for holding a supply of joint compound therein; and a pneumatic-powered, gravity fed diaphragm pump for delivering joint compound from the supply reservoir to the workstation outlet, the pump having a pump inlet connected to the bottom of the supply reservoir to receive joint compound from the supply reservoir through the bottom of the supply reservoir and a pump outlet located below the pump inlet; and a transport tube removably connected directly to the pump outlet for feeding joint compound from the pump outlet to the workstation outlet;

wherein the pump is self-draining when the transport tube is removed from the pump outlet.

12. The workstation of claim 16 wherein the pump inlet is provided with a ball valve permitting one-way flow of the joint compound into the pump through the pump inlet towards the pump outlet, and the ball valve includes a ball that floats in water.

13. The workstation of claim 12 wherein the ball valve comprises:

a circular collar disposed in the pump inlet and defining a valve seat;

a support seat positioned in the inlet; and the floating ball which moves in the pump inlet between the circular collar and the support seat.

14. The workstation of claim 11 wherein the pump outlet is provided with a ball valve permitting one way flow of the joint compound from the pump through the pump outlet, and the ball valve includes a ball that floats in water.

15. A drywall joint compound pump workstation for supplying joint compound to a workstation outlet to fill one or more drywall finishing tools, the workstation comprising:

a supply reservoir having an open top and a closed bottom for holding a supply of joint compound therein;

a pump attached to the supply reservoir;

a filling adaptor incorporating the workstation outlet, said workstation outlet being configured to facilitate filling of a drywall finishing tool;

a transport tube having a first end connected to the pump and a second end joined to the filling adaptor for feeding joint compound from the pump to the filling adaptor; and a shut-off valve for selectively preventing the flow of joint compound through the workstation outlet of the filling adaptor.

16. The workstation of claim 15 wherein the first end of the transport tube is further provided with a quick disconnect fitting to facilitate removal of the filling adaptor.

17. The workstation of claim 15 wherein the workstation outlet on the filling adaptor comprises water hose threads and the workstation further comprises a water cleaning attachment having a first end removably attached to the water hose threads on the filling adaptor and a free end provided with a spray nozzle secured thereto.

18. The workstation of claim 15 wherein the filling adaptor is a tubular filling adaptor having a lower end removably mounted to the second end of the transport tube and an upper end incorporating the workstation outlet, said workstation outlet being cooperable with a filler neck on a drywall finishing tool that applies joint compound to finish a drywall surface.

19. The workstation of claim 18 wherein the tubular filling adaptor has a 45° bend.

20. The workstation of claim 15 wherein the filling adaptor is a flat joint box dispenser tube having a first end removably attached to the second end of the transport tube, and a second end incorporating the workstation outlet, said workstation outlet comprising a horizontally oblong opening to facilitate filling a flat joint box with joint compound.

21. The workstation of claim 15 wherein the filling adaptor is a movable gooseneck attachment having a first end removably connected to the second end of the transport tube and a second end swingably positioned over and away from the supply reservoir.

22. The workstation of claim 16 wherein the filling adaptor is a first filling adaptor which is configured to fill a first type of drywall finishing tool, and the workstation further comprises a second filling adaptor that is configured to fill a second type of drywall finishing tool.

23. The workstation of claim 22 further comprising a third filling adaptor that is configured to fill a third type of drywall finishing tool.

24. The workstation of claim 23 further comprising a fourth filling adaptor that is configured to fill a fourth type of drywall finishing tool.

* * * * *

UNITED STATES PATENT AND TRADEMARK OFFICE

CERTIFICATE OF CORRECTION

PATENT NO. : 5,878,925

DATED : March 9, 1999

INVENTOR(S) : JEFFREY L. DENKINS ET AL.

It is certified that error appears in the above-indentified patent and that said Letters Patent is hereby corrected as shown below:

TITLE PAGE:

In References Cited - Other References

Please insert --Texspray Compact brochure, Graco, Inc., Form No. 300-351, December 1993--.

In the Claims

Claim 12, Col. 12, Line 66, delete "claim 16" and substitute therefor --claim 11--

Signed and Sealed this

Thirty-first Day of August, 1999

Attest:

Q. TODD DICKINSON

*Attesting Officer* — *Acting Commissioner of Patents and Trademarks*